(12) United States Patent
Ambrosi et al.

(10) Patent No.: US 11,221,051 B2
(45) Date of Patent: Jan. 11, 2022

(54) BRAKE SYSTEM DAMPING DEVICE

(71) Applicant: Robert Bosch GmbH, Stuttgart (DE)

(72) Inventors: Massimiliano Ambrosi, Abstatt (DE); Edgar Kurz, Heilbronn-Horkheim (DE); Wolfgang Schuller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 91 days.

(21) Appl. No.: 16/775,842

(22) Filed: Jan. 29, 2020

(65) Prior Publication Data

US 2020/0263746 A1 Aug. 20, 2020

(30) Foreign Application Priority Data

Feb. 14, 2019 (DE) .................. 10 2019 202 018.6

(51) Int. Cl.
*F16D 65/00* (2006.01)
*B60T 13/58* (2006.01)
*F16F 9/04* (2006.01)
*B60T 17/00* (2006.01)
*F16L 55/033* (2006.01)
*B60T 8/40* (2006.01)
*F16L 55/053* (2006.01)

(52) U.S. Cl.
CPC ........ *F16D 65/0006* (2013.01); *B60T 8/4068* (2013.01); *B60T 13/581* (2013.01); *B60T 17/00* (2013.01); *F16F 9/0454* (2013.01); *F16L 55/0338* (2013.01); *F16L 55/053* (2013.01)

(58) Field of Classification Search
CPC .... F16D 65/0006; B60T 13/581; B60T 17/00; B60T 17/04; B60T 11/107; B60T 11/16; B60T 8/409; F16F 9/0454; F16L 55/0338
See application file for complete search history.

(56) References Cited

U.S. PATENT DOCUMENTS

| | | | | |
|---|---|---|---|---|
| 3,797,818 | A * | 3/1974 | Willich | B60R 19/32 267/122 |
| 4,896,752 | A * | 1/1990 | Shtarkman | B60G 15/00 188/266.1 |
| 5,425,573 | A * | 6/1995 | Mirlocca | B60T 8/42 138/30 |
| 5,460,438 | A * | 10/1995 | Hellmann | F16L 55/04 303/119.3 |
| 5,718,488 | A * | 2/1998 | Schneider | B60T 8/4068 138/30 |
| 5,735,314 | A * | 4/1998 | Alaze | B60T 8/4872 138/31 |

(Continued)

*Primary Examiner* — Vishal R Sahni
(74) *Attorney, Agent, or Firm* — Maginot, Moore & Beck LLP

(57) ABSTRACT

A brake system damping device includes a first space to which hydraulic pressure is to be applied, a second space in which a compressible medium is situated, and a first separation element configured to separate the first space from the second space. The brake system damping device further includes a third space in which a compressible medium is situated and a second separation element configured to separate the second space from the third space. The second space is connected in medium-conducting terms to the third space by a passage configured in the second separation element. The third space and the second separation element having the passage thereof are configured by an integral component.

17 Claims, 10 Drawing Sheets

(56) References Cited

U.S. PATENT DOCUMENTS

| | | | | |
|---|---|---|---|---|
| 6,017,099 | A * | 1/2000 | Schneider | B60T 8/4872 |
| | | | | 303/87 |
| 6,076,557 | A * | 6/2000 | Carney | F15B 1/103 |
| | | | | 138/30 |
| 6,336,534 | B1 * | 1/2002 | Rancourt | F16D 65/0006 |
| | | | | 188/249 |
| 9,234,531 | B2 * | 1/2016 | Wald | B60T 17/04 |
| 2005/0116535 | A1 * | 6/2005 | Paulsen | B60T 11/206 |
| | | | | 303/87 |
| 2006/0103233 | A1 * | 5/2006 | Lenz | F15B 1/024 |
| | | | | 303/87 |
| 2012/0133201 | A1 * | 5/2012 | Zeoli | B60T 8/4291 |
| | | | | 303/11 |
| 2013/0287609 | A1 * | 10/2013 | Fellmeth | F04B 7/02 |
| | | | | 417/437 |
| 2014/0000740 | A1 * | 1/2014 | Wald | F16L 55/053 |
| | | | | 138/30 |
| 2014/0144732 | A1 * | 5/2014 | Bayer | B60T 8/409 |
| | | | | 188/106 P |
| 2018/0347595 | A1 * | 12/2018 | Karamanev | F15B 1/103 |
| 2020/0263746 | A1 * | 8/2020 | Ambrosi | F16F 9/0454 |
| 2020/0384973 | A1 * | 12/2020 | Kurz | F16L 55/053 |
| 2020/0386291 | A1 * | 12/2020 | Kurz | F16F 9/05 |
| 2021/0018053 | A1 * | 1/2021 | Kurz | B60T 17/22 |
| 2021/0054890 | A1 * | 2/2021 | Kurz | F16L 55/053 |

* cited by examiner

BRAKE SYSTEM DAMPING DEVICE

This application claims priority under 35 U.S.C. § 119 to patent application no. DE 10 2019 202 018.6, filed on Feb. 14, 2019 in Germany, the disclosure of which is incorporated herein by reference in its entirety.

BACKGROUND

The disclosure relates to a brake system damping device having a first space to which hydraulic pressure is to be applied, and a second space in which a compressible medium is situated, and a first separation element for separating the first space from the second space.

Brake systems, in particular hydraulic brake systems, serve for decelerating a travelling speed of vehicles such as, for instance, passenger motor vehicles and commercial motor vehicles. In the operation of such brake systems, various dynamic effects, inter alia pressure variations in lines and spaces present in said brake systems that lead to oscillations or pulsations and, on account thereof, to undesirable noises and vibrations arise. In order for such oscillations to be minimized, or in order to achieve a damping effect in those oscillations, respectively, brake system damping devices, hereunder also referred to as dampers, are used at one or a plurality of installation locations in the brake system. Said dampers comprise a first space in which a hydraulic pressure is to be applied. The space is fundamentally a type of container. The pressure is fundamentally the result of a force acting on an area. A force is transmitted hydraulically, that is to say by way of a pressurized fluid, in the dampers.

Dampers having a separation element which separates the space into a first space in which a liquid or a fluid, respectively, is situated, and a second space in which a compressible medium, typically in the form of a gas, is situated, are known. As is common knowledge, the volume of a space of a deformable container in which a gas is situated decreases when increased pressure is exerted on said container from the outside. Likewise, the volume of the second space also decreases by means of the separation element when a hydraulic pressure is applied to the first space.

When this pressure decreases again, the volume of the gas and thus of the second space thus increases accordingly. The second space thus acts like a pneumatic spring, also referred to as a gas spring. The softness or hardness of the damping by said gas spring depends on the gas volume of the second space. The larger the gas volume the softer the damping.

A vehicle driver in a braking procedure steps on a brake pedal which herein covers a pedal travel. Said pedal travel is directly correlated to the gas volume of the second space which is relevant here. The larger the gas volume the longer also the pedal travel. The positive effect of soft damping is thus paired with the negative effect of a large pedal travel.

SUMMARY

The disclosure is based on the object of providing a device for damping oscillations in a brake system having improved damping properties.

According to the disclosure, a brake system damping device having a first space to which hydraulic pressure is to be applied, and a second space in which a compressible medium is situated, and a first separation element for separating the first space from the second space is achieved. According to the disclosure, the brake system damping device has a third space in which a compressible medium is situated, and has a second separation element for separating the second space from the third space, wherein the second space in medium-conducting terms is connected to the third space by means of a passage designed in the second separation element, and wherein the third space as well as the second separation element having the passage thereof are designed by means of an integral component.

A volume which has a compressible medium and is subdivided into two spaces and is simultaneously produced using only one integral component is achieved by way of the solution according to the disclosure. This component can be produced in a cost-effective manner and be advantageously assembled. A comparatively large compressible volume which ensures an advantageous spring characteristic for the targeted damping effect is simultaneously provided by way of the component. The third space, like the second space, thus contains the compressible medium which is preferably designed using a gas and particularly preferably using air. The second separation element separates the third space from the second space, wherein the two spaces however initially remain connected by means of the medium-conducting passage. The passage, or the link, respectively, is preferably designed by way of a simple bore.

Furthermore achieved according to the disclosure is a brake system damping device, in particular of the above-mentioned type, having a first space to which hydraulic pressure is to be applied, and a second space in which a compressible medium is situated, and a first separation element for separating the first space from the second space. The brake system damping device herein is designed having a third space in which a compressible medium is situated, and having a second separation element for separating the second space from the third space, wherein the second space in medium-conducting terms is connected to the third space by means of a passage designed in the second separation element, and wherein the first separation element is designed so as to be movable and by way of the movement thereof herein so as to be supported on the second separation element. In this solution according to the disclosure, the second separation element acts as a stroke delimitation for the first separation element. The movement of the first separation element is restricted by way of said stroke delimitation, and said first separation element is guided in such a manner that the latter performs a predefined movement in the second space and thereby performs a predefined decrease in terms of the volume of said second space.

In a brake system damping device of this type according to the disclosure, the first separation element by way of the movement thereof is preferably to bear in a holohedral manner on the second separation element. It is ensured by way of bringing to bear the first separation element in a holohedral manner on the second separation element that no residual volumes remain between said two separation elements. In a movement of the first separation element of this type, the second space is thus completely partially emptied in the direction toward the third space.

The second space by way of the movement of the first separation is preferably to be reduced in size concentrically toward the passage. The concentric movement ensures that a single residual volume remains ahead of the passage in the second space, said residual volume being able to be further displaced through the passage into the third space.

The second space by way of the movement of the first separation element is furthermore preferably to be completely emptied. No compressible volume continues to exist in the second space by way of the complete emptying of the latter, and no further damping correspondingly takes place therein according to the disclosure. The first separation element simultaneously bears on the second separation element and accordingly also can no longer self-deform. The entire damping effect of the brake system damping device is thus cancelled. It is thus ensured that the brake system henceforth acts in particular directly on the associated brakes.

The second separation element preferably has a separation element internal wall which, when viewed in the longitudinal section of the second space, runs in an arcuate manner toward the passage. The arcuate shape leads to the first separation element bearing continuously and continually on the second separation element, this thus preventing that dead volumes remain between the two separation elements and are potentially trapped therebetween.

The first separation element is advantageously designed having a membrane, preferably having a roll membrane. Membranes here are in principle to be understood as sealing elements which as elastic, movable separation walls or separation elements, respectively, hermetically separate two spaces in relation to one another. Roll membranes herein are especially provided for one-sided compressive stress in the direction of an internal side of the loop, or a membrane head depression. Roll membranes offer only a negligibly minor inherent rigidity in relation to volumetric variations, or only a minor resistance in relation to elastic deformation, respectively. Roll membrains by virtue of the shaping thereof are thus particularly suited as separation elements for the brake system damping device according to the disclosure.

Alternatively or additionally, the first separation element at least in portions is also advantageously designed as a disk having a circular shape, wherein the first separation element has in particular a circular membrane curvature which is disposed so as to be concentric with the center of the circular shape. Such a disk-shaped membrane can be advantageously disposed in a bore and herein simultaneously ensures that the second space is emptied, or reduced in size, respectively, in a concentric manner.

The second space is particularly preferably delimited by means of a separation element internal wall of the second separation element that is disposed so as to be opposite the first separation element and is designed having a bowl-shape. The bowl designed in such a manner forms a support for the first separation element on which the latter can bear in a continuously progressive and in particular also holohedral manner.

The third space as well as the second separation element having the passage thereof are preferably formed by means of a component by way of which the first separation element is simultaneously held in a housing. A plurality of functions can thus be represented by way of the integral component of this type, wherein the component is simultaneously able to be produced and assembled in a cost-effective manner. Such a component is particularly advantageously produced by means of 3D printing, injection molding, centrifugal casting, or blow molding, wherein the third space is configured as a cavity in the component.

In one advantageous refinement of the brake system damping device according to the disclosure, a closure element by means of which the passage is to be closed, or is closed, respectively, as soon as the hydraulic pressure in the first space has reached a predefined pressure value is furthermore to be moved by way of the first separation element. The closure element is preferably simply a region of the area on the surface of the first separation element. Said closure element closes the passage only once a hydraulic pressure sufficient therefore bears on the first space. Specifically, the first separation element, in particular as from the predefined pressure value, is deformed to such an extent that said first separation element then bears on the second separation element. The second separation element thus preferably forms a detent for the closure element. The third space, by virtue of the closed passage, is then decoupled from the second space and is thus no longer available to the remaining damper. Only the medium volume in the second space remains for the further damping effect above the predefined pressure value. Said medium volume in the second space, by virtue of the first separation element deformed in the direction of the second separation element, is now relatively small. The damper according to the disclosure now has only a minor elasticity and damping effect, since the second space can now receive hardly any volume. The advantageous effect herein is however that a pedal travel, or the travel of a brake pedal of the brake system when activated by means of a vehicle driver, respectively, is no longer substantially extended in terms of length. The first separation element when closing the passage particularly advantageously even bears completely on the internal wall of the second space, including that side of the second separation element that faces the second space, such that the second space is entirely eliminated, or no longer has any volume, respectively. In this instance, the pedal travel is not at all further extended in terms of length as from the predefined pressure value. The damping effect which is likewise eliminated on account thereof is justifiable, because the pressure range relevant in terms of damping is below the predefined pressure value. The pressure value is thus preferably chosen or predefined, respectively, such that said pressure value represents the upper limit value of a pressure range relevant in terms of damping. The respective volumes of the second and the third space herein are preferably tuned to the relevant pressure range and to the desired elasticity, or damping effect, respectively, of the damper. In this advantageous manner, the damper combines the great elasticity of the large medium volume in the pressure range relevant in terms of damping with a delimitation of the volume that can be received in the first space above said pressure range. In other words, there is no longer any direct correlation between the displaced volume of brake medium and the medium volume used for the damping. The damper thus offers outstanding damping properties and a short pedal travel. A further advantage of the refinement is that the pressure in the closed-off third space is significantly lower than the pressure in the second space would be without any passage to a further space, thus in the prior art. Undesirable effects are reduced on account thereof. On the one hand, the permeation through the first separation element is decreased at a lower pressure, and the temperature of the medium at a lower pressure is not so high, on the other hand, on account of which aging of the material of the first separation element is delayed.

The acceptance by customers and the opportunities of vehicles in the market which are equipped with the brake system damping device according to the disclosure can be significantly increased with the aid of the technical advantages set forth.

The first separation element is advantageously configured so as to be integral to the closure element. Integral means that two elements, presently the first separation element and the closure element, are molded in one piece, or as one part, respectively. This has the advantage of simple assembly and cost-effective production.

In one advantageous refinement of the disclosure, the first separation element is produced from an elastomer, preferably from ethylene propylene diene monomer rubber. Elastomers are dimensionally stable but elastically deformable plastics materials. Said plastics materials can therefore be deformed under tension and compressive stress, but thereafter returned to their original, non-deformed shape. Elastomers are thus particularly suitable materials for separation elements in the context of this disclosure, such as for the roll membrane described above, for example. The elastomer must retain its elasticity and must neither swell nor shrink excessively. Therefore, a suitable elastomer has to be used for the medium to be sealed. Ethylene propylene diene monomer rubber, also referred to as EPDM for short, is an elastomer that is resistant to a brake medium and therefore particularly suitable for use in the brake system damping device according to the disclosure.

Moreover, the pre-defined pressure value according to the disclosure is advantageously predefined as a value between 0 and 30 bar, preferably between 3 and 10 bar, in particular preferably at 5 bar. When a brake system applies a pressure of approximately 60 bar to an associated wheel of a vehicle, this reliably causes blocking of the wheel. However, only a significantly smaller, limited pressure range is relevant in terms of the damping of oscillations or pulsations, respectively, in the brake systems. The disturbing oscillation or pulsation, respectively, is already adequately damped once a pressure value of approximately 5 bar is reached. The pressure value is therefore particularly advantageously to be established at this value.

The passage is furthermore preferably formed by way of an open-pore material. A material is open-pore when said material contains pores which prevent the ingress of liquids but permit the exit of gases, or the permeation by the latter, respectively. Reference is also made to a breathable material. The pores would be closed like passages of another design, such as bores for example, when the first separation element bears thereon. The advantage of the open-pore material however lies in that no liquid can invade the third space. The brake system would thus have an additional protection in relation to a leakage of brake fluid from the brake system, for example when the first separation element is damaged or lacks tightness.

Moreover, a plurality of passages are preferably provided in the second separation element. Said passages in the braking procedure ensure a more rapid redistribution of the medium from the second into the third space. On account thereof, the elasticity of the entire medium volume can be better exploited.

In one further advantageous embodiment, the third space is subdivided into a plurality of sub-spaces which in medium-conducting terms are in each case connected to the second space by means of a passage. The plurality of sub-spaces permit higher flexibility in comparison to the utilization of only a single third space. The passages to the individual sub-spaces are thus preferably closed successively by means of the first separation element, on account of which the damping effect is decreased in stages, rather than completely and abruptly at the one predefined pressure value. Moreover, a variable number of sub-spaces and thus a variable medium volume can be used by means of closing passages and making said passages available again. This facilitates the tuning of the damper to the relevant pressure range and the desired elasticity.

According to the disclosure, the third space is advantageously also formed by means of the second separation element and a cover. The cover is provided as a closure for a brake system having the brake system damping device according to the disclosure, and enables flexible access to the brake system. On account thereof, simple replacing of the second separation element is possible. Moreover, brake system damping devices which to date utilize only a single space between the cover and an elastic separation element for damping, can be retrofitted with the second separation element.

Processing therefrom, the second separation element is completely enclosed by the cover and the first separation element. On account thereof, the second and the third space having the contained medium volume are additionally sealed. A complete enclosure of the second separation element moreover means that the combination of said three components externally does not differ from a combination of only the cover and the first separation element. On account thereof, the design of the second separation element is independent of the remaining part of the brake system. Even removing the second separation element from the damper is thus possible, preferably when a larger medium volume is required.

Furthermore advantageous are further embodiments which render the brake system damping device even more efficient or enhance the latter by way of alternative embodiments.

The compressible medium which is contained in the second and the third space is thus preferably designed as a gas, and particularly preferably as air. Air is readily available, can be used without costs, and is compressible, and thus outstandingly suitable for use in the brake system damping device according to the disclosure.

The medium volume, or the second and the third space, respectively, alternatively and advantageously are produced or achieved, respectively, by means of a combination of a plurality of turned parts, cold-formed parts, or deep-drawn parts. Turned parts are components having a circular cross-section; cold-formed parts are closure components, and deep-drawn parts are body components of vehicles. All said components can thus be readily procured in the automotive field and by means of the disclosure are imparted a new purpose.

The brake system damping device is moreover preferably provided for use in closed-loop driving dynamics control systems and/or externally powered brake systems. A closed-loop driving dynamics control system, or an electronic stability program, also referred to as ESP, respectively, is an electronically controlled driver assistance system for a motor vehicle which by the targeted breaking of individual wheels counteracts the swerving of the motor vehicle. An externally powered brake system, or an externally powered brake installation, respectively, is operated by means of an externally generated force. For example, an electro-hydraulically operated brake is an externally powered brake in which the activation energy emanates from a hydraulic pressure reservoir which is charged by a pump.

In one advantageous embodiment, the brake system damping device has a rib structure that supports the second separation element and penetrates the third space, in particular having a structure end side and at least one structure rib. The rib structure herein is preferably disposed on the second separation element on that side that faces away from the first separation element, or that side having the separation element external wall, respectively, so as to support the second separation element in relation to a pressure acting on the separation element internal wall. The separation element external wall thus forms a first end side of the rib structure. The opposite end side, or the second end side, respectively, of the rib structure is formed by the structure end side which is preferably designed so as to be planar. The structure rib is a structural element of the supporting rib structure, and extends from the separation element external wall up to the structure end side. The brake system damping device is inherently more stable by virtue of the supporting function of the rib structure. Moreover, the material of the second separation element is stressed to a lesser degree, this having a positive effect on the service life of the material.

The rib structure is preferably designed having two or more structure ribs so as to provide the rib structure with further stability. Moreover, the rib structure is advantageously configured having a vertical circular hollow cylinder which commences so as to be centric on the separation element external wall and, proceeding therefrom, extends up to the second end of the rib structure, or the structure end side, respectively. A cylindrical cavity configured in the circular hollow cylinder in medium-conducting terms herein is preferably connected to the passage in the second separation element. At this juncture it is to be explicitly pointed out that the passage in the second separation element must not be closed by the rib structure in any case.

The structure ribs commence externally on the circular hollow cylinder and at those locations, hereunder referred to as commencement locations, have an extent or rib depth, respectively, which corresponds to the length of the circular hollow cylinder. The structure ribs from said commencement locations preferably extend radially, or in the manner of rays, respectively, away from the circular hollow cylinder, on account of which a star-shaped structure is created. The rib depth of each one of the structure ribs herein varies in a manner corresponding to the shape of the end sides of the rib structure bearing thereon. As has already been mentioned, the structure end side is preferably planar and thus does not cause any variation in terms of the rib depth. The separation element external wall by contrast is designed so as to be largely non-planar, or so as to be three-dimensional, respectively. The respective rib depth in this instance has to be variable, or be designed so as to correspond to the separation element external wall, respectively. The stability of the rib structure is further improved on account thereof.

The rib structure preferably forms at least two structure sub-spaces which in medium-conducting terms are connected to one another by means of at least one connection duct. The structure sub-spaces herein are in each case formed by means of at least one structure rib, the separation element external wall, and a further component that surrounds the third space. Said component is preferably the cover, as has already been mentioned above. The structure sub-spaces herein are preferably disposed in such a manner that a supporting rib structure is created, or the supporting effect of the rib structure is further enhanced. The connection duct is an opening in an element, preferably in a structure rib, that separates the two structure spaces from one another. In this way, the compressible medium from the second space makes its way into each one of the structure sub-spaces of the divided third space and thus develops maximum damping for the brake system damping device. Moreover, in as far as desirable, a lower degree of damping can be set by means of closing off individual structure sub-spaces, or closing individual connection ducts, respectively.

If the rib structure is designed having the circular hollow cylinder, as described above for an advantageous embodiment, one connection duct leads to each one of the structure sub-spaces preferably emanating from said cylindrical cavity. In this way, a uniform dissemination of the medium, and thus uniform stressing of all regions of the rib structure, can be achieved.

As has been already mentioned above, the compressible medium is preferably designed as a gas, and particularly preferably as air. Therefore, the third space hereunder is also referred to as the second air chamber, the structure sub-spaces also as sub-air chambers, and the medium volume also as the air volume. Accordingly, the second air chamber has been replaced by a plurality of connected sub-air chambers which receive an air volume, wherein a desired staged damping of the brake system damping device is able to be set by means of the air sub-chambers. In other words, the proposed construction mode offers design potentials for connecting the air chambers by means of the connection ducts.

Moreover, the second separation element is not only provided for separating the second space from the third space, or from the second air chamber, respectively, but preferably also fulfils a holding or supporting function, respectively, for the first separation element. As has already been mentioned above, the first separation element is advantageously designed having a membrane. Therefore, the second separation element hereunder is also referred to as a membrane support component. An inherently stable membrane support component which moreover offers a plurality of design potentials of the third space, or the division of the latter, is created by means of the described rib structure. Moreover, the described design of the membrane support component permits the use of cost-effective mold-based components which can be produced, for example, by means of technologies such as injection-molding.

In one further advantageous embodiment, the rib structure has a rib jacket which is designed so as to surround the rib structure and in particular so as to have a jacket external wall as well as a jacket internal wall. The rib jacket is a type of hollow cylinder which encloses the rib structure and extends from the separation element external wall up to the structure end side. The jacket external wall herein bears on the component that surrounds the third space. The jacket internal wall forms a face up to which the structure ribs extend. The rib structure by way of the rib jacket is designed so as to be more compact and even more stable.

The rib structure and the rib jacket are preferably integrally designed, preferably so as to be integral to the second separation element. Integral means, as has already been mentioned, that a plurality of elements, presently the rib structure having the rib jacket, as well as preferably also having the second separation element, is molded in one piece, or as one part, respectively. The advantage here lies in a simple assembly and cost-effective production.

According to the disclosure, the rib jacket is moreover advantageously designed having at least one jacket slot, wherein the jacket slot is disposed so as to preferably extend from the structure end side in the direction of the separation element external wall, and is provided for opening the rib jacket toward one of the structure sub-spaces. The jacket slots thus form clearances in the otherwise completely closed rib jacket. The volume for the compressible medium that can be received is enlarged by means of said clearances or free spaces, respectively, on account of which the degree of damping of the brake system damping device is increased. Material is moreover saved.

The rib jacket is furthermore preferably designed having at least one latching element, wherein the latching element is preferably disposed so as to project from the jacket external wall and preferably on the structure end side. The latching element is a nub or hook which is provided for latching in a clearance within the component that surrounds the jacket external wall. The latching element thus offers the possibility of anchoring the second separation element in the third space. The brake system damping device on account thereof benefits from additional stability.

Proceeding therefrom, the latching element is disposed so as to bear on two jacket slots. The two jacket slots run in each case directly along the latching element on account of which a flexible support installation, or a support installation that can be push-fitted, respectively, is formed for the latching element. The second separation element can thus be more easily assembled, or be guided to a latching location, respectively. In particular when the second separation element is produced from a material which is deformable only with great difficulty, the assembly of said separation element is significantly facilitated by means of the support installation formed.

According to the disclosure, the brake system damping device advantageously has a component that comprises the rib jacket, having a component internal wall in which the component internal wall is designed having a depression encircling the jacket external wall, wherein the depression is provided for latching the latching element therein. The component is preferably the cover or the housing of the brake system damping device. The component internal wall, or a face of the component that bears on the rib jacket, or the jacket external wall thereof, respectively, conjointly with the latching hooks disposed on the jacket external wall, forms a form-fitting connection between the second separation element, or the membrane support component, and the surrounding component, preferably the cover. The depression is preferably the clearance described above. Since the depression in the surrounding component is designed so as to be encircling, but the at least one latching element by contrast is designed individually, said form-fitting connection is flexible and in terms of the position thereof independent in relation to the latching element.

Moreover, the structure end side is disposed so as to bear on the component internal wall so as to be supported on the latter. The bearing on the component internal wall increases the supporting effect of the rib structure and significantly reduces the contact pressure per unit area on the component internal wall, preferably the cover. On account thereof, instead of very solid materials such as preferably from machined metal, softer and/or more cost-effective materials can also be used for the membrane support component, or the second separation element, respectively. Cost-effective mold-based components can thus also be used as a membrane support component.

In one advantageous embodiment, the second separation element is produced by means of injection-molding, preferably by means of powder injection-molding, and particularly preferably by means of metal powder injection-molding. Injection-molding, also referred to as diecasting or diecasting method, is a production method, more specifically a primary forming method for producing components. The respective material herein is liquefied using an injection-molding machine and is injected under pressure into a mold. Powder injection molding, also referred to as the PIM (powder injection molding) method, is a primary forming method for producing components from metal or ceramics. Consequently, metal powder injection molding, also referred to as the MIM (metal injection molding) method, is a primary forming method for producing especially metallic components. The second separation element, or the membrane support component, respectively, can be produced in a very simple and cost-effective manner as a mold-based component by means of said technologies.

In one advantageous refinement of the disclosure, the brake system damping device has a fourth space which is disposed so as to surround the rib jacket of the second separation element so as to provide an additional damping volume. The fourth space is implemented in that the component that surrounds the rib jacket, preferably the cover, is designed so as to be smaller or shorter, respectively. The fourth space thus forms a further decouplable chamber for additionally receiving medium volume, preferably air volume, without enlarging the space requirement within the brake system damping device. The larger the available volume, the more elastic and thus more effective the brake system damping device is in terms of reducing pulsations or damping, respectively. This proposed solution thus opens up possibility for optimizing the function without any additional input in terms of complexity and cost.

Moreover, the second separation element is designed having a bearing ring which encloses the rib jacket and has a ring external periphery, wherein the bearing ring is disposed so as to protrude into the fourth space and to bear on the first separation element. The bearing ring herein firmly bears on the jacket external wall of the ring jacket and from the latter extends radially, preferably as far as the size of the fourth space permits as a maximum. The ring external periphery delimits the bearing ring toward the outside, and preferably bears on an internal wall of the fourth space. The fourth space by way of the bearing disposal of the bearing ring on the first separation element, preferably a membrane, is delimited in the direction of the first separation element, and the first separation element herein is supported or stabilized, respectively. This also contributes toward the stability of the entire brake system damping device. Moreover, the second separation element, or the membrane support component, respectively, now forms a bearing face of an externally encircling sealing region of the first separation element, preferably of the membrane.

The second separation element is furthermore preferably designed so as to be integral to the bearing ring. Integrally designed means, as has already been mentioned above, that two elements are molded in one piece, or as one part, respectively, having the advantage of a simple assembly and cost-effective production.

In one further advantageous refinement of the disclosure, at least one annular rib that supports the bearing ring is disposed on the bearing ring. The annular rib is thus a structural or supporting element, respectively, which preferably is disposed so as to bear not only on the bearing ring, but also on the jacket external wall of the ring jacket and/or the internal wall of the fourth space. The bearing ring is additionally stabilized on account thereof.

Proceeding therefrom, two or more annular ribs by way of which the fourth space is divided into at least two ring sub-spaces are preferably disposed on the bearing ring. The ring sub-spaces herein are in each case advantageously formed by means of two annular ribs, the internal wall of the fourth space, the jacket external wall of the ring jacket, and the bearing ring. The ring sub-spaces herein are so-called chambers which for the external radial delimitation thereof utilize a non-modified interface bore in a component that surrounds the fourth space, said component preferably being the housing. This new design of the second separation element on the circumference thereof thus configures additional ring sub-spaces, preferably air chambers, which can be utilized for the further enhancement and setting capability of the damping.

In one further embodiment, the annular ribs are disposed on the jacket external wall, in each case opposite a structure rib on the jacket internal wall. This arrangement in which the annular ribs form a type of extension of the structure ribs, provides additional stability for the second separation element and moreover simplifies the production of the latter.

The jacket slots are preferably disposed in such a manner that said jacket slots in medium-conducting terms connect the third space to the fourth space. The jacket slots by means of this arrangement act as connection ducts between the structure sub-spaces in the third space and the ring sub-spaces in the fourth space. In other words, the volume of individual surrounding chambers by means of longitudinal slots, which by the way are configured on the latching elements, preferably the latching hooks, are coupled to the interior volume, preferably air volume, of the rib structure. In this way, the compressible medium makes its way from the structure sub-spaces into the ring sub-spaces and thus develops the maximum damping for the brake system damping device. Moreover, in as far as desired, a lower degree of damping can be set also here by means of closing-off individual ring sub-spaces, or closing individual jacket slots, respectively.

According to the disclosure, the at least one annular rib is advantageously disposed so as to extend from the jacket external wall up to the ring external wall of the bearing ring. This arrangement effectively utilizes the fourth space, provides the bearing ring with very high stability, and enables sealing between the ring sub-spaces.

In one further advantageous refinement of the disclosure, the component comprising the rib jacket has a component external wall, wherein the component external wall bears in a sealing manner on the housing internal wall. The component comprising the rib jacket, as has already been mentioned above, is preferably the cover. In one such preferred embodiment, the tightness of the brake system damping device in relation to the outside is configured between the housing and the cover. The tightness of the brake system damping device is thus guaranteed in a particularly sustainable manner, because none of the components stressed in breaking procedures, such as the first or the second separation element, have to contribute in terms of tightness.

The component comprising the rib jacket, preferably the cover, is particularly advantageously designed and disposed in such a manner that the annular ribs of the second separation element latch, or are latched, respectively, in the cover. On account thereof, the component is additionally fastened or secured, respectively, in the brake system damping device. Moreover, the ring sub-spaces are better sealed in relation to one another in this way.

The housing internal wall moreover preferably bears in a sealing manner on the component external wall in that the component that comprises the rib jacket is inserted into the housing by means of a press-fit. Press-fitting is a method in which the parts to be connected when being joined are deformed only in a substantially elastic manner and any unintentional release is prevented on account of a force-fitting connection. Force-fitting connections require a normal force acting on the faces to be connected to one another. The mutual displacement of said faces is prevented as long as the counterforce caused by the static friction is not exceeded.

The press-fitting preferably takes place by means of a press-fit fastener. Consequently, the component that comprises the rib jacket, said component preferably being the cover, would have to be designed as a press-fit fastener. The press-fitting of a press-fit fastener is also referred to as self-clinching technology. Press-fit fasteners, or self-clinching fasteners are fastening elements which jam or close, respectively, in a self-acting manner and which are able to be attached to metal panels, substrates, or openings in a ductile or deformable, respectively, material without welding or additional fastening.

In one further advantageous refinement of the disclosure, the membrane holding installation of the second separation element is designed so as to be outwardly expanded in the manner of a bead and/or a trumpet. The first separation element on account thereof is fixed firmer and tighter to the housing internal wall. Moreover, a movement of the closure element and of the membrane fold in the direction of the second separation element is thus better guided, and bearing of the first separation element on the separation element internal wall of the second separation element in a better form-fitting manner is facilitated.

BRIEF DESCRIPTION OF THE DRAWINGS

Exemplary embodiments of the solution according to the disclosure will be explained in more detail hereunder by means of the appended schematic drawings in which.

DETAILED DESCRIPTION

Figure 1:
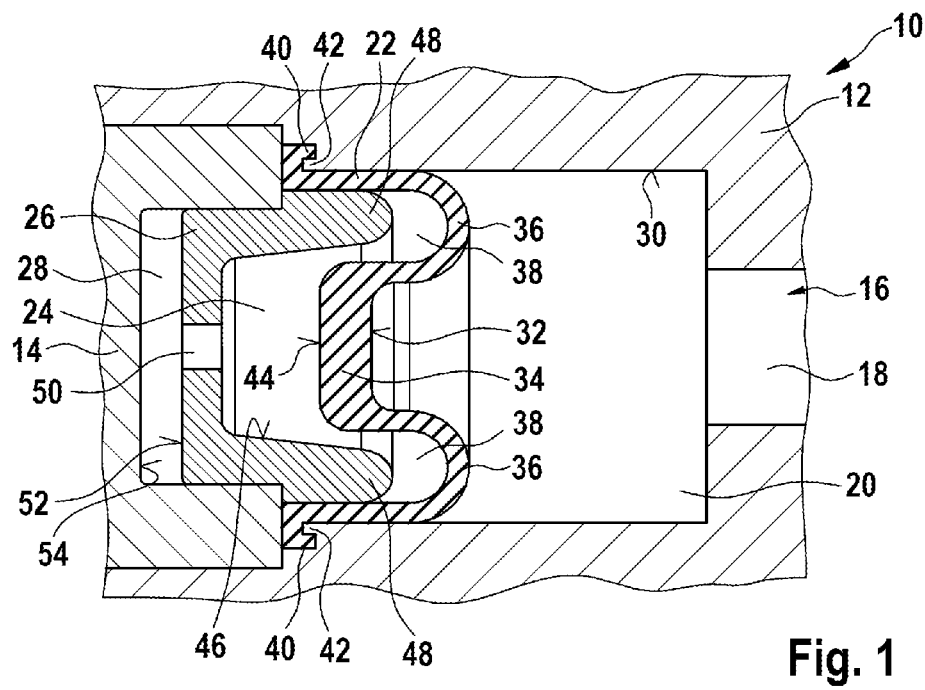
FIG. 1 shows a first exemplary embodiment of a brake system damping device according to the disclosure.

A brake system damping device 10 having a housing 12 and a cover 14 is illustrated in FIG. 1. A supply line 16 in which there is presently no hydraulic pressure is disposed in the housing 12, this being illustrated by means of a scratched arrow. The supply line 16 opens into a first space 20 which is adjoined by a first separation element 22, here a roll membrane. When viewed from the first space 20, a second space 24 is situated behind the first separation element 22, said second space 24 being adjoined by a second separation element 26, wherein a third space 28 in the viewing direction is situated behind the second separation element 26.

In detail, said spaces 24, 24, 28 and separation elements 22, 26 are as follows. The first space 20 is surrounded by a housing internal wall 30 and a first separation element internal wall 32 of the first separation element 22, hereunder referred to as the roll membrane. A closure element 34 from which the separation element 22 extends further outward toward a membrane fold 36 is disposed so as to be centric in the separation element 22, said closure element 34 being integral to said separation element 22. A membrane fold depression 38 is disposed within the membrane fold 36, or is surrounded by the latter, respectively. In a manner adjoining the membrane fold 36, the separation element 22 extends up to a membrane collar 40 which encompasses a coupling mount 42 of the housing 12. The separation element 22 designed as a roll membrane, by way of part of the separation element internal wall 32 thereof, bears in a sealing manner on the housing internal wall 30, and by way of a first separation element external wall 44 faces the second space 24. The second space 24 is surrounded by the first separation element external wall 44 and a second separation element internal wall 46 of the second separation element 26.

The second separation element 26 by way of a membrane holding installation 48 extends into the membrane fold depression 38. A passage 50 which connects the second space 24 to the third space 28 is disposed so as to be centric in the second separation element 26. The passage 50 herein runs through the second separation element internal wall 46, the second separation element 26, and a second separation element external wall 52. The third space 28 is surrounded by the second separation element external wall 52 and a cover internal wall 54 of the cover 14.

In the initial state of the brake system damping device 10 illustrated, there is initially no hydraulic pressure in the first space 20 in which a break medium is situated. The separation element 22 here, which is produced from an elastomer, is substantially in the basic shape thereof. Said separation element 22 herein bears on the housing internal wall 30 such a manner that the first space 20 is hermetically sealed in relation to the second space 24, wherein a gas, here especially air, is situated in the second space 24. Said gas is also situated in the third space 28 which is connected to the second space 24 by means of the passage 50. These two spaces 24, 28 thus form a common gas volume that is available for damping. By virtue of the greater elasticity of said gas volume, a better damping effect is achieved when braking, or when applying a hydraulic pressure to the first space 20, respectively.

When a hydraulic pressure is applied in the first space 20, the separation element 22 is deformed in such a manner that the gas volume in the second space 24 is reduced in size. The closure element 34 herein moves into the second space 24. As from a specific hydraulic pressure which is established above a pressure range relevant to damping, the closure element 34 bears on the second separation element internal wall 46 of the second separation element 26 and closes the passage 50 toward the third space 28. The second separation element 26 herein acts like a detent. States of the braking system damping device 10 in which the separation element 22, or the closure element 34 thereof, respectively, bears on the second separation element 26 and closes the passage 50 are illustrated in FIG. 2 and FIG. 3.

The third space 28 by virtue of the closed passage 50 is now separated from the second space 24, on account of which only the remaining gas volume in the second space 24 can now be used for the further damping. The elasticity and damping effect is now only minor, because the second space 24 can barely receive any more volume. This effect is intentional, because the travel of a brake pedal connected to the brake system is thus also no longer substantially extended in terms of length. In the state of the brake system damping device 10 illustrated in FIG. 3, the separation element 22 and the second separation element 26 bear on one another without a gap, or so as to be holohedral, respectively, such that the second space 24 is entirely eliminated, or no longer has any volume, respectively. The travel of the brake pedal is no longer extended in length in this case.

As soon as the hydraulic pressure applied in the first space 20 decreases, the separation element 22 moves back into the initial state thereof, or to the initial position thereof, respectively.

Figure 2:
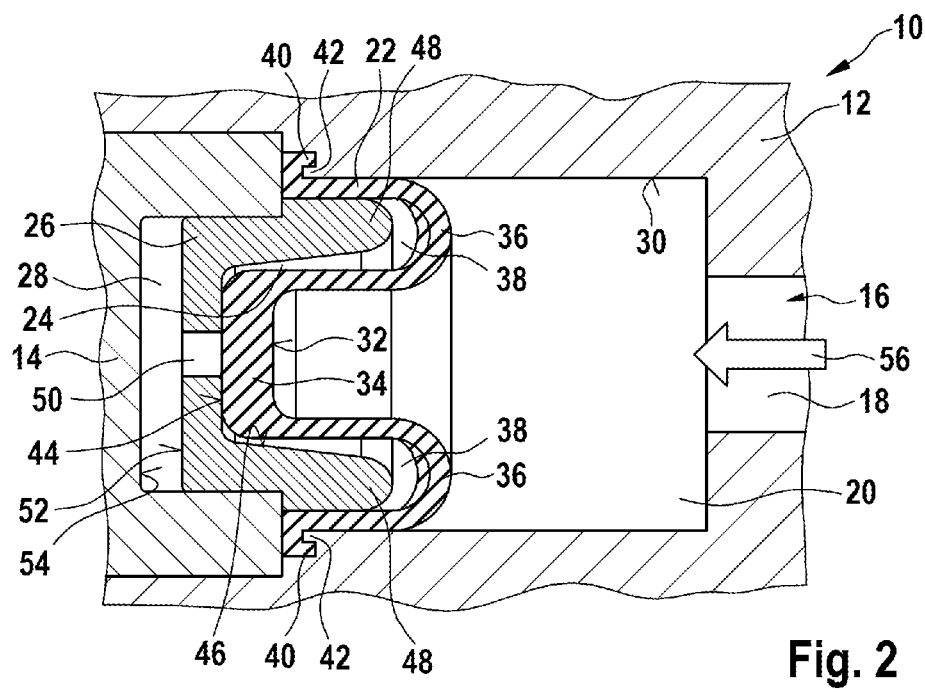
FIG. 2 shows the brake system damping device in FIG. 1 with a first hydraulic pressure applied thereto.
Figure 3:
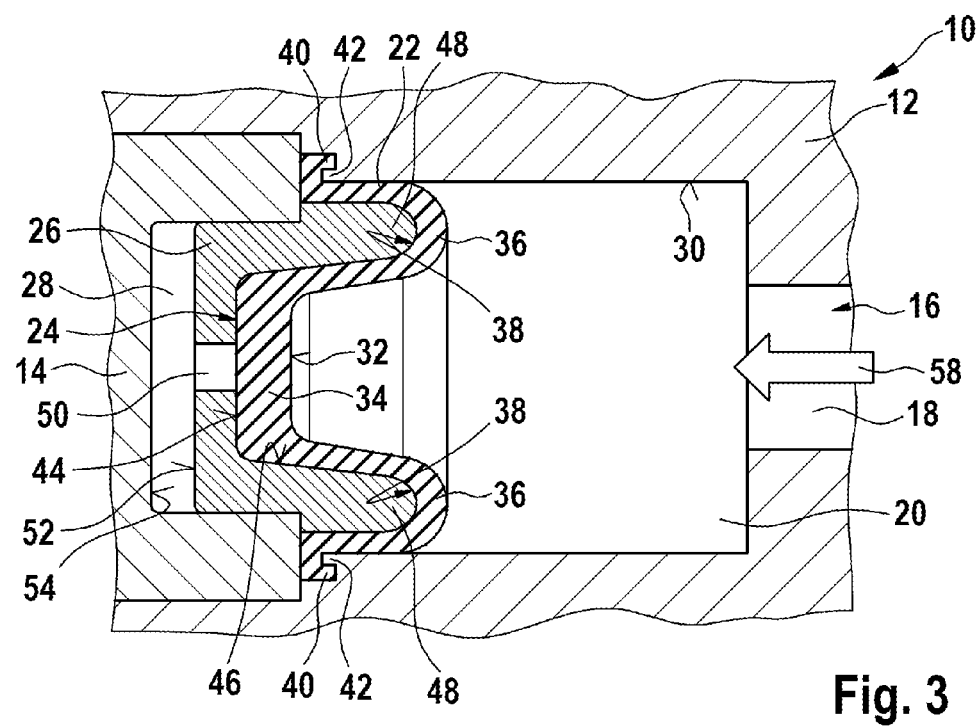
FIG. 3 shows the brake system damping device in FIG. 1 with a second hydraulic pressure applied thereto.

FIG. 2 shows the brake system damping device 10 from FIG. 1, however in a state in which a first hydraulic pressure is applied to the first space 20, this being illustrated by means of an arrow 56 in the region of the supply line 16.

As has already been mentioned, the closure element 34 herein bears on the second separation element internal wall 46 of the second separation element 26 and closes the passage 50 toward the third space 28. Only the remaining volume in the second space 24 is thus now available for the further damping. In the illustration of FIG. 2, said remaining volume is mainly the region about the membrane holding installation 48. The effects on the damping and the brake procedure have already been explained in detail in the description pertaining to FIG. 1 and are therefore not described again here.

The brake system damping device 10 from FIG. 1 is illustrated in FIG. 3, however in a state in which a second hydraulic pressure is applied to the first space 20, this being illustrated by means of an arrow 58 in the region of the supply line 16.

As has already been mentioned, the closure element 34 herein bears on the second separation element internal wall 46 of the second separation element 26 and closes the passage 50 toward the third space 28. Moreover, the separation element 22 and the second separation element 26 bear on one another without a gap such that the second space 24 no longer has any volume. The effects associated therewith on the damping and the brake procedure have already been explained in detail in the description pertaining to FIG. 1 and are therefore not described again here.

Figure 4:
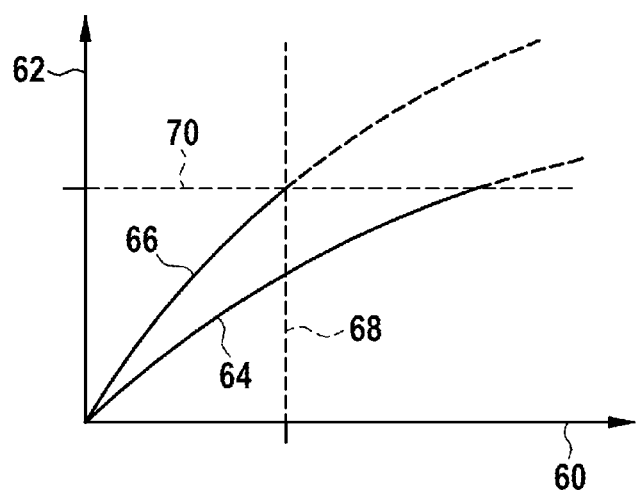
FIG. 4 shows a diagram with characteristic lines pertaining to the correlation of pressure and volume received in brake system damping devices.

FIG. 4 shows a diagram pertaining to the correlation between pressure 60 and a volume received 62 in brake system damping devices of this type. The pressure 60 herein is illustrated on the x-axis and the volume received 62 on the y-axis. A first characteristic line 64 and a second characteristic line 66 extend from a point of origin of the coordinates of the diagram. Moreover, the diagram shows a vertical dashed line 68 that intersects the x-axis, and a horizontal dashed line 70 that intersects the y-axis.

The first characteristic line 64 shows the correlation between pressure and volume received for a brake system damping device having a small volume of medium that is available for the damping. For simplification, the volume of the second space 24 in FIG. 1 is to be assumed for said characteristic line 64.

The second characteristic line 66 which extends above the first characteristic line 64 shows the correlation of pressure and volume received for a brake system damping device having in comparison to the above a large volume of medium that is available for the damping. For simplification, the added volumes of the second and the third space 24, 28 in FIG. 1 are to be assumed for the characteristic line 66.

A predefined pressure value 68 which forms the upper limit of a pressure range which is relevant to the pulsation damping in brake systems of this type is illustrated by way of the vertical dashed line that intersects the x-axis. Said relevant pressure range thus extends from the origin of the coordinates up to the dashed line.

A volume detent 70 for the brake system damping device 10 according to the disclosure is illustrated by way of the horizontal dashed line that intersects the y-axis. Said volume detent is approximately at the volume of the second space 24 in FIG. 1.

The brake system damping device 10 by means of correspondingly conceiving the respective volumes of the second and the third space 24, 28 is tuned to the relevant pressure range and the desired elasticity, or damping effect, respectively, in this pressure range. In the case of optimum tuning, as is illustrated in the diagram of FIG. 4, the dashed lines 68, 70 and the characteristic line 66 intersect at one point.

Figure 5:
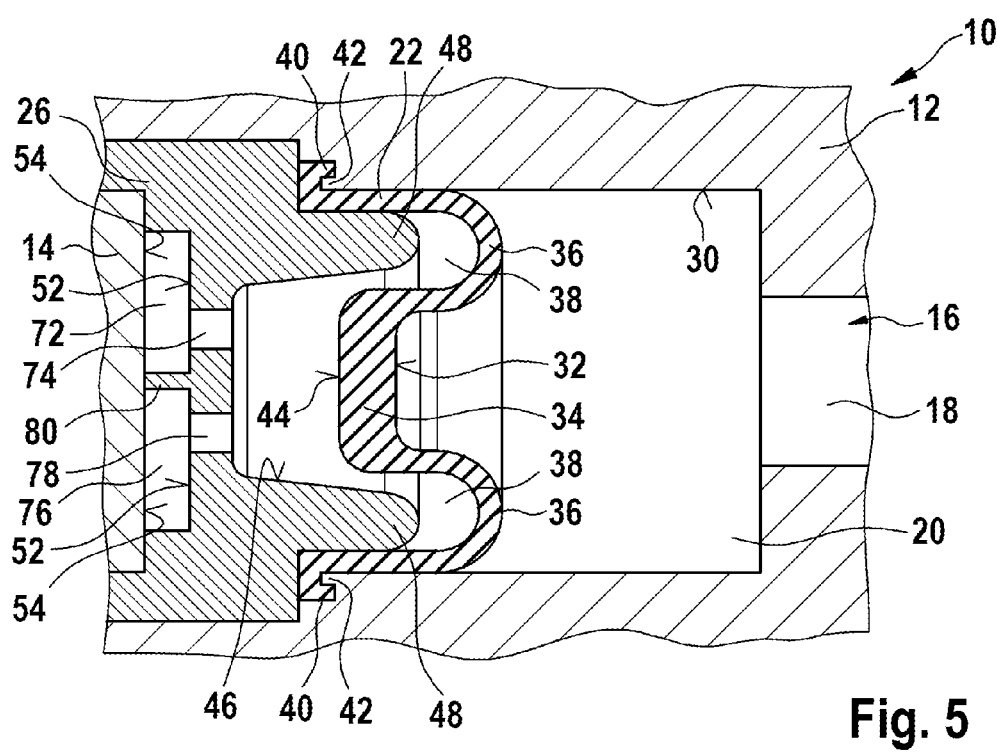
FIG. 5 shows a second exemplary embodiment of a brake system damping device according to the disclosure.

A brake system damping device 10 which differs from the one in FIG. 1 only in that the first separation element 22 designed as a roll membrane by way of the first separation element external wall 44 faces is illustrated in FIG. 5. The separation element 22 per se, and the region which the separation element 22 by way of the first separation element internal wall 32 faces, are completely identical to FIG. 1, and are not described again here.

The main point of differentiation in relation to the brake system damping device 10 in FIG. 1 is that the brake system damping device 10, instead of the third space 28 and the associated passage 50 in FIG. 1, in FIG. 5 here has a first sub-space 72 having a passage 74, and a second sub-space 76 having a second passage 78. The two sub-spaces 72, 76 herein are separated by means of a separation wall 80. A further point of differentiation in relation to FIG. 1 lies in that the second separation element 26 in FIG. 5 here extends up to the housing internal wall 30 and separates the cover 14 from the latter.

All further features correspond to those in FIG. 1. The second space 24 here is thus also surrounded by the first separation element external wall 44 and a second separation element internal wall 46 of the second separation element 26. The second separation element 26 by way of a membrane holding installation 48 here likewise extends into the membrane fold depression 38 of the separation element 22. Moreover, the sub-spaces 72, 76 beside the separation wall 80, as is the third space 28 in FIG. 1, are surrounded by the second separation element external wall 52 and a cover internal wall 54 of the cover 14.

The functional mode here is similar to that of the brake system damping device 10 in FIG. 1. When a hydraulic pressure is applied in the first space 20, the separation element 22 here is also deformed in such a manner that the gas volume in the second space 24 is reduced in size. The closure element 34 herein moves into the second space 24 and, as from a specific hydraulic pressure which ideally corresponds to the upper limit of the relevant pressure range, bears on the second separation element 26 and closes the passages 74, 78 toward the sub-spaces 72, 76.

As soon as the hydraulic pressure applied to the first space 20 decreases, the separation element 22 designed as a roll membrane moves back to the initial state thereof, or to the initial position thereof, respectively. On account thereof, the passages 74, 78 are opened again in this instance, and the sub-spaces 72, 76 are connected to the second space 24 again.

Figure 6:
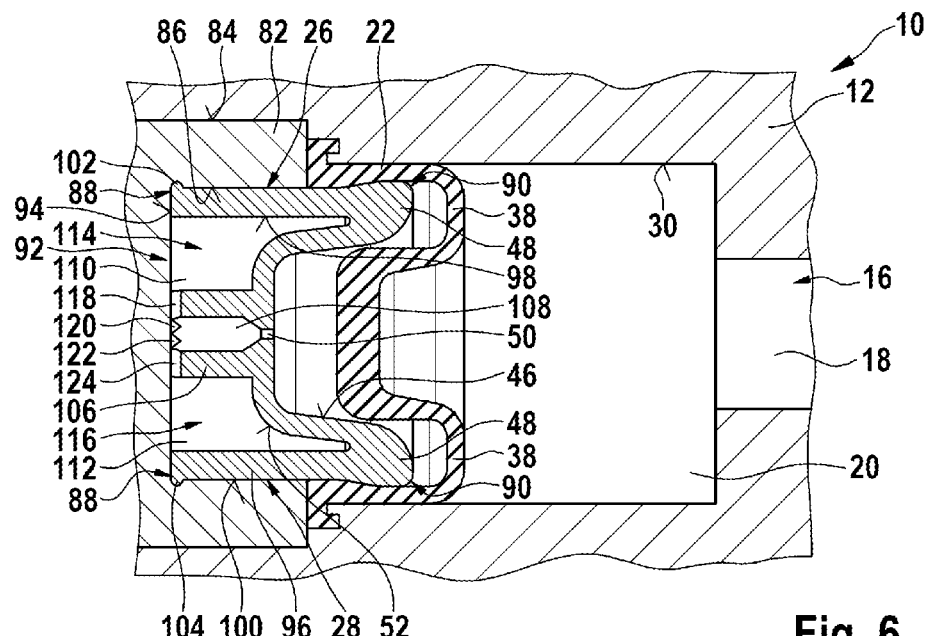
FIG. 6 shows a third exemplary embodiment of a brake system damping device according to the disclosure.

FIG. 6 shows a brake system damping device 10 which differs from the one in FIG. 1 in the replacement of the cover 14 and in particular the design of the second separation element 26. The remaining components in FIG. 6 are identical to those in FIG. 1 and are not described again here. Only this much: in the illustrated state of the brake system damping device 10, no hydraulic pressure 18 in the supply line 16 is supplied to the first space 20 such that the first separation element 22 is in a normal shape, or initial shape, respectively, as in FIG. 1. In FIG. 6, a component 82 having a component external wall 84 and a component internal wall 86 is used in place of the cover 14 in FIG. 1. Said component 82 here can likewise be used as a cover. The component 82 herein bears on the first separation element 22 such that the second separation element 26 is completely enclosed by the component 82 and the first separation element 22. The component internal wall 86 has a depression 88 which encircles the second separation element 26 and here is disposed at a maximum distance from the first separation element 22. The component external wall 84 bears on the housing 30, or the housing internal wall 30 of the latter, respectively.

The second separation element 26 on the side of the separation element internal wall 46 is designed so as to be substantially exactly like the second separation element 26 in FIG. 1. The point of differentiation lies only in that the membrane holding installation 48 within the membrane fold depression 38 is designed so as to expand in a trumpet-shaped or bead-shaped manner, respectively, toward the outside, or in the direction of the housing internal wall 30, respectively, this here being referred to as the external curvature 90. The second separation element 26 on the side of the separation element external wall 52 has a rib structure 92 which extends from the separation element external wall 52 up to a structure end side 94 and thus penetrates the entire third space 28. The rib structure 92 is designed so as to be integral to the second separation element 26 and is moreover surrounded by a rib jacket 96 having a jacket internal wall 98 and a jacket external wall 100. The rib jacket 96 extends from the separation element external wall 52, more specifically from the membrane holding installation 48, up to the structure end side 94. A plurality of latching elements, only the latching elements 102 and 104 being visible here, are disposed on the jacket external wall 100, so as to be adjacent to the structure end side 94, said latching elements being disposed so as to be latched in the depression 88.

A circular hollow cylinder 106 having a cylindrical cavity 108 is disposed within the center of the rib structure 92, said cylindrical hollow cylinder 106 being placed on the separation element external wall 52 in such a manner that the passage 50 leads to the cylindrical cavity 108. A plurality of structure ribs, of which only the structure ribs 110 and 112 are visible here, extend from the circular hollow cylinder 106 up to the rib jacket 96, or the jacket internal wall 98 thereof, respectively. The structure ribs 110, 112 subdivide the third space 28 within the ring jacket 96 into a plurality of structure sub-spaces of which only the structure sub-spaces 114 and 116 are visible here. The structure spaces are connected to the cylindrical cavity 108 by means of connection ducts of which only the connection ducts 118, 120, 122, and 124 are visible here. The connection ducts 118, 120, 122, 124 herein are disposed on the structure end side 94.

The brake system damping device 10 illustrated here in terms of the fundamental functional mode thereof is comparable to the brake system damping device 10 in FIG. 1. Here too, the component 82, such as the cover 14 in FIG. 1, bears in a stabilizing manner on the first separation element 22, for example. In said brake system damping device 10 illustrated in FIG. 6 there is additionally the supporting function of the rib structure 92 which moreover enables the degree of damping to be set in stages, as well as the second separation element 26 to be anchored in a latching manner in the component 82, here designed as a cover. The supporting effect is achieved in that all components of the rib structure 92 extend from the separation element external wall 52 up to the structure end side 94, wherein the structure end side bears on the component internal wall 86. The setting of the degree of damping can be carried out by means of closing one or a plurality of the connection ducts 118, 120, 122, 124 to the structure sub-spaces 114, 116. The latching anchoring in the component 82 takes place by means of the latching elements 102, 104. The latching elements 102, 104 are pushed inward, thus into the rib jacket 96 when inserting the second separation element 26 into the component 82, or when push-fitting the component 82 onto the second separation element 26, respectively. As soon as the structure end side 94 has reached the component internal wall 86, the latching elements 102, 104 latch into the depression 88 provided therefor in the component 82.

Figure 7:
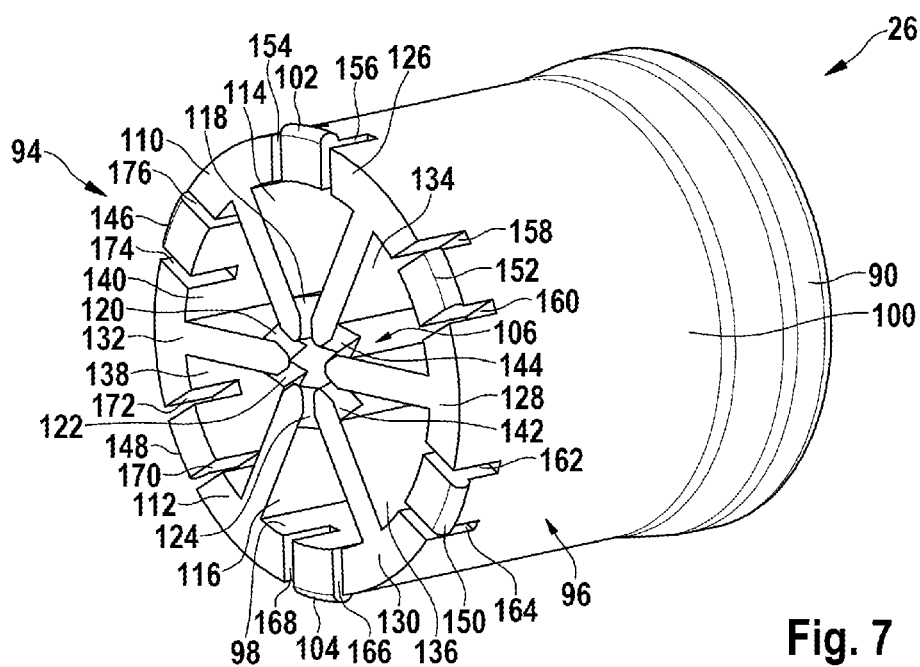
FIG. 7 shows the detail VII according to FIG. 6.

The second separation element 26 from FIG. 6 is illustrated in a perspective view toward the structure end side 94 in FIG. 7. The rib structure 92 is therefore particularly well visible. The external curvature 90 and the jacket external wall 100 can also be seen more clearly here. Apart from the structure ribs 110 and 112, the further structure ribs 126, 128, 130, and 132 which extend from the cylindrical hollow cylinder 106 up to the rib jacket 96, or the jacket internal wall 98 thereof, are now also illustrated. The structure sub-spaces 114, 116, 134, 136, 138, 140 are disposed between the structure ribs 110, 112, 126, 128, 130, 132 and by means of the connection ducts 118, 120, 122, 124, 142, 144 connected to the cylindrical cavity 108. Apart from the latching elements 102 and 104, the further latching elements 146, 148, 150, 152 on the jacket external wall 100 and on the structure end side 94 are now also illustrated. Each of said latching elements 102, 104, 146, 148, 150, 152 is disposed so as to bear on two of a plurality of jacket slots 154, 156, 158, 160, 162, 164, 166, 168, 170, 172, 174, 176, wherein the jacket slots 154, 156, 158, 160, 162, 164, 166, 168, 170, 172, 174, 176 extend from the structure end side 94 in the direction of the external curvature 90.

The components which are newly illustrated here and which in terms of the nomenclature are similar to those illustrated in FIG. 6, such as the further latching elements 146, 148, 150, 152, for example, also have identical functions. Therefore, such components are not again explained in terms of the function thereof. The jacket slots 154, 156, 158, 160, 162, 164, 166, 168, 170, 172, 174, 176 are entirely new in terms of visibility, and have therefore not yet been described in terms of the functionality thereof. Said jacket slots do not only have the purpose of making available additional volume of the third space 28. When viewed from the structure end side 94, the jacket slots 154, 156, 158, 160, 162, 164, 166, 168, 170, 172, 174, 176 arrange in particular the rib jacket 96 in such a manner that the latching elements 102, 104, 146, 148, 150, 152 are separated. Depending on the flexibility of the material of the second separation element 26, the regions of the rib jacket 96 on which one of the latching elements 102, 104, 146, 148, 150, 152 is disposed can be pushed inward more or less easily. On account thereof, the assembly of the second separation element 26 and/or of the component 82, described in the context of FIG. 6, is substantially facilitated.

Figure 8:
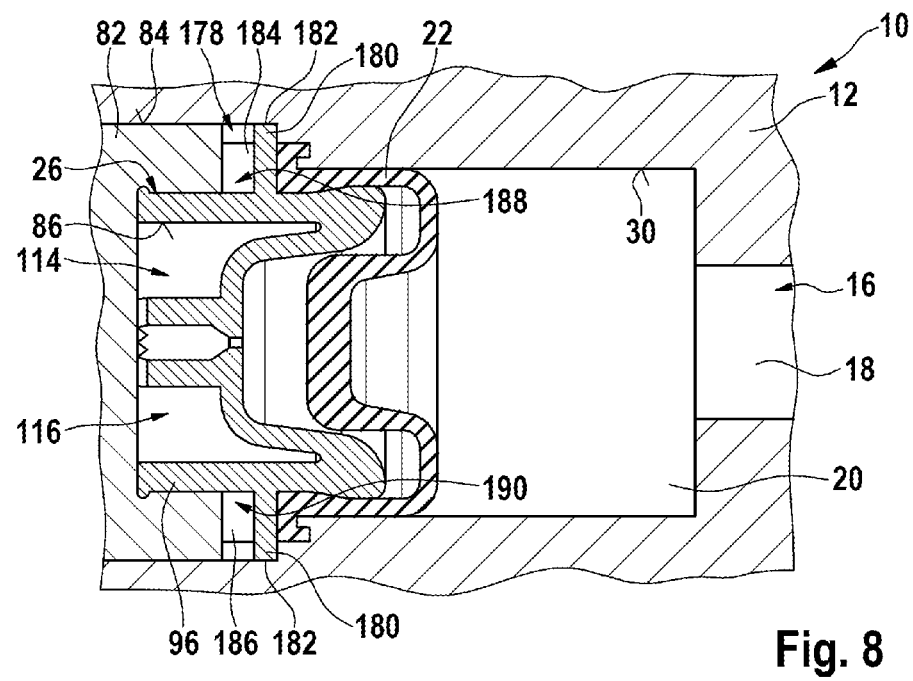
FIG. 8 shows a third exemplary embodiment of a brake system damping device according to the disclosure.

FIG. 8 shows a brake system damping device 10 which differs from the one in FIG. 6 in terms of the design of the component 82 and of the second separation element 26. Here too, no hydraulic pressure 18 is thus applied to the first space 20 by means of the supply line 16. As opposed to FIG. 6, the component 82 here in FIG. 8, by way of the component external wall 84 and the component internal wall 86, does not reach up to the first separation element 22. On account thereof, a fourth space 178 which encircles the second separation element 26, or the rib jacket 96 thereof, respectively, is configured. The second separation element 26 here has a bearing ring 180 that encircles the rib jacket 96, and is designed so as to be integral to said bearing ring 180. The bearing ring 180 has a ring external periphery 182 and protrudes into the fourth space 178 in such a manner that said bearing ring 180 bears on the first separation element 22, and moreover by way of the ring external periphery 182 terminates on the housing 12, or on the housing internal wall 30, respectively. The fourth space 178 is thus surrounded, or configured, respectively, by the housing 12, the component 82, and the second separation element 26, or the rib jacket 96, respectively, and the bearing ring 180 of the second separation element 26.

The fourth space 178 by means of a plurality of annular ribs, of which only the two annular ribs 184 and 186 are illustrated here, is divided into a plurality of ring sub-spaces of which only the ring sub-spaces 188 and 190 are illustrated here. The ring sub-spaces 188, 190 in medium-conducting terms herein are connected to the structure sub-spaces 114, 116 by means of the jacket slots 154, 154, 166, 168 (only illustrated in FIGS. 7 and 9). All further components and details in FIG. 8 correspond to those in FIG. 6 and are not set forth again here.

The brake system damping device 10 illustrated here in terms of the fundamental functional mode thereof is comparable to the brake system damping device 10 in FIG. 6. However, the component 82 here no longer bears in a stabilizing manner on the first separation element 22. This task here is assumed by the bearing ring 180 of the second separation element 26. The fourth space 178 created by virtue of the smaller or shorter, respectively, component 82 is now available as additional volume, on account of which an even higher degree of damping of the brake system damping device 10 is achieved. The degree of damping here can also be set in stages by virtue of the fourth space 178 being divided into a plurality of ring sub-spaces 188, 190. Moreover, the annular ribs 184, 186 which divide the fourth space 178 support the bearing ring 180 in relation to the component 82.

Figure 9:
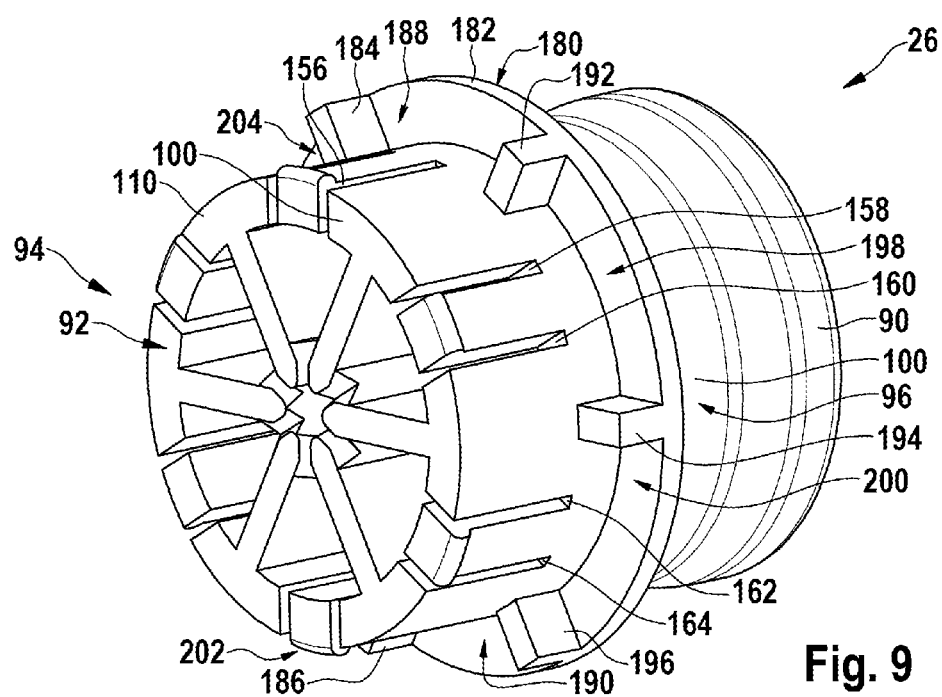
FIG. 9 shows the detail IX according to FIG. 8.

The second separation element 26 from FIG. 8 is illustrated in a perspective manner in FIG. 9. The external curvature 90 and the jacket external wall 100 of the rib jacket 96 can likewise be clearly seen again. The focus in FIG. 9 is in particular on the bearing ring 180 having the ring external periphery 182 thereof and on the annular ribs which are disposed on the bearing ring 180 and of which, apart from the annular ribs 184 and 186, further annular ribs 192, 194, 196 are illustrated here. The rib structure 92 on the structure end side 94 in the perspective illustrated here cannot be readily seen, but corresponds to the rib structure 92 in FIG. 7. The jacket slots 156, 158, 160, 162, and 164 in the rib jacket 96 which extend from the structure end side 94 in the direction of the bearing ring 180 can be readily seen. The bearing ring 180 and the annular ribs 184, 186, 192, 194, 196 are disposed on the jacket external wall 100 in such a manner that the jacket slots 156, 158, 160, 162, 164 reach closer to the bearing ring 180 than the annular ribs 184, 186, 192, 194, 196 project from said bearing ring 180. Ring sub-spaces of which, apart from the ring sub-spaces 188 and 190, further ring sub-spaces 198, 200, 202, 204 are also indicated here, in medium-conducting terms are connected only thus to structure sub-spaces 114, 116, 134, 136, 138, 140 (only illustrated in FIG. 7).

The components which are newly illustrated here and which in terms of the nomenclature are similar to those illustrated in FIG. 8, such as for example the further annular ribs 192, 194, 196, also have identical functions. Therefore, such components are not explained again in terms of the function thereof. The jacket slots 154, 156, 158, 160, 162, 164 are newly visible here and have therefore not yet been described in terms of the functionality thereof in FIG. 8. The other jacket slots 166, 168, 170, 172, 174, 176 illustrated in FIG. 7 are not illustrated for this embodiment. However, since the second separation element 26 is designed so as to be symmetrical, an overall picture by means of the visibly illustrated components can be deducted. Moreover, it can be deducted by means of combining FIG. 8 and FIG. 9 how the ring sub-spaces 188, 190, 198, 200, 202, 204 by means of the jacket slots 154, 156, 158, 160, 162, 164 are connected to the ring structure 92 within the rib jacket 96.

Figure 10:
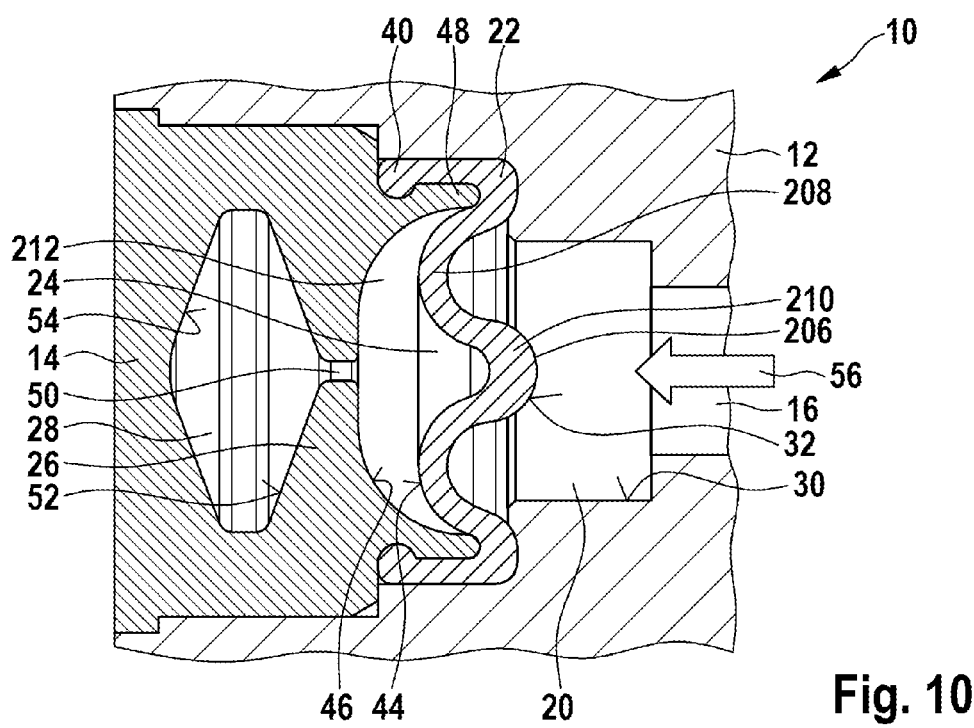
FIG. 10 shows a fourth exemplary embodiment of a brake system damping device according to the disclosure.

A further variant of a brake system damping device 10 having a housing 12 and a cover 14 is illustrated in FIG. 10. Supply line 16 in which a hydraulic pressure is applied is likewise disposed in the housing 12, said supply line 16 again being illustrated by means of an arrow 56. The supply line 16 opens into a first space 20 which is adjoined by a first separation element 22, here a roll membrane. When viewed from the first space 20, a second space 24 which is adjoined by a second separation element 26 is situated behind the first separation element 22, wherein a third space 28 in the viewing direction is situated behind the second separation element 26. The cover 14 and the second separation element 26 herein are designed as an integral component which is produced by means of a 3D printing method. The third space 28 in this component is designed in the form of a cavity which is circular in the cross section and is substantially diamond-shaped in the longitudinal section.

Figure 11:
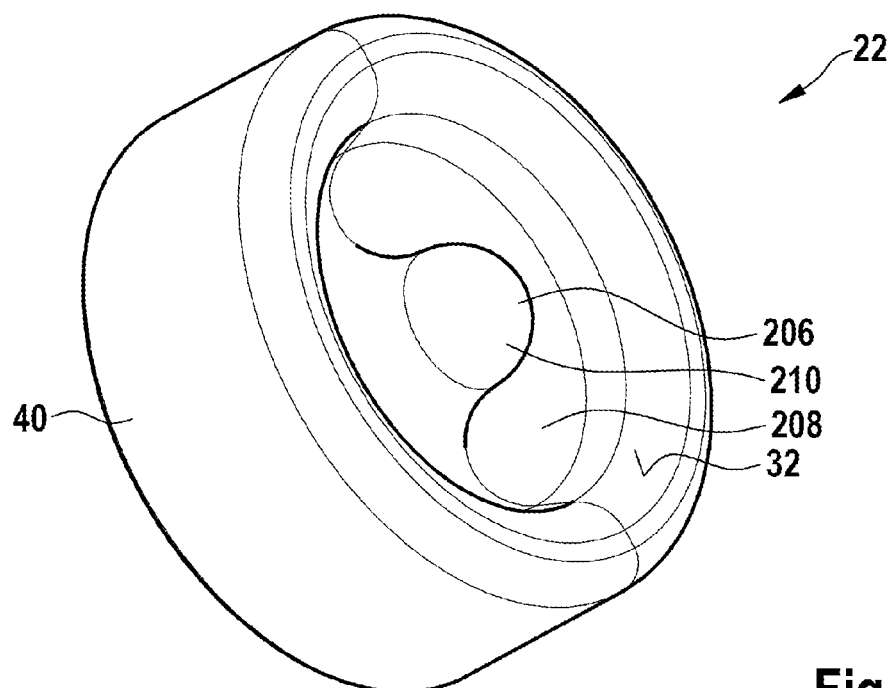
FIG. 11 shows a front prospective view of a separation element of the brake system damping device according to FIG. 11.
Figure 12:
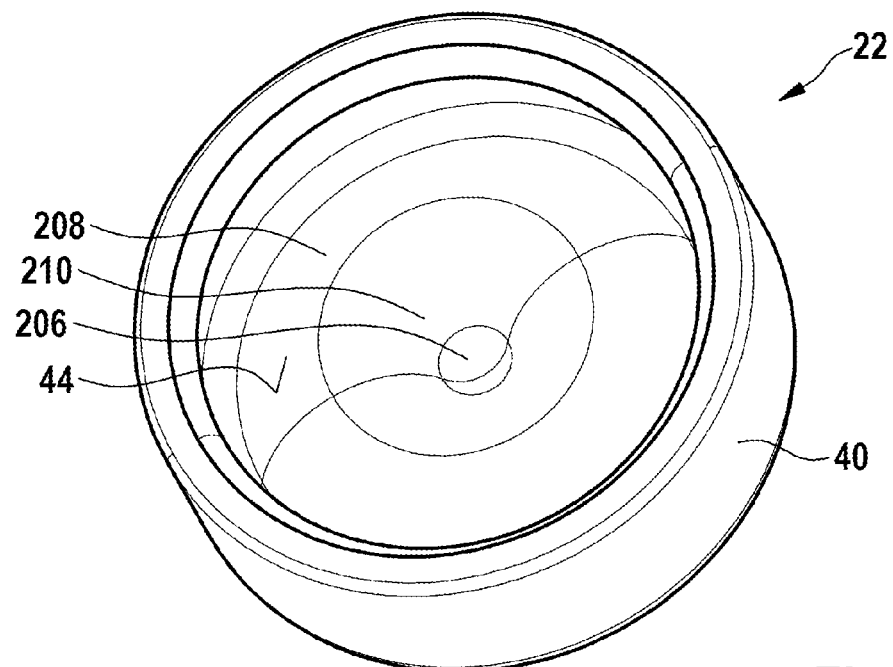
FIG. 12 shows a rear perspective view of a separation element of the brake system damping device according to FIG. 11.

The first space 20 is surrounded by a housing internal wall 30 and a first separation element internal wall 32 of the first separation element 22. The separation element 22 is designed as a disk having a circular shape and a center 206. A first membrane curvature 208 is configured so as to be concentric with the center 206 in the circular and disk-shaped membrane of this type of the separation element 22, and a second membrane curvature 210 is configured within said first membrane curvature 208. The membrane curvature 208 herein is circular and, when viewed in the longitudinal section illustrated in FIG. 10, is curved outward so as to be convex toward the second separation element 26. The second membrane curvature 210 is likewise circular, but when viewed in the longitudinal section, is curved inward so as to be concave toward the second separation element 26. The first separation element 22 of this type thus has a membrane fold depression 38 which, when viewed in the longitudinal section, is directed towards the supply line 16 (see also FIGS. 11 and 12).

The membrane curvature 208 on the external side bears directly on a membrane holding installation 48 such as is also provided in the brake system damping device 10 according to FIG. 1. The separation element 22 encompasses said membrane holding installation 48 on the external side, and thereon by means of a membrane collar 40 is placed about the second separation element 26. The separation element 22 designed in such a manner as a roll membrane, by way of part of the separation element internal wall 32 thereof, bears in a sealing manner on the housing internal wall 30, and by way of a first separation element external wall 44 faces the second space 24. The second space 24 is again surrounded by the first separation element external wall 44 and a second separation element internal wall 46 of the second separation element 26. Said separation element internal wall 46, when viewed in the longitudinal section of FIG. 10, runs in an arcuate manner toward the passage 50 and herein has a bowl-shape 212.

A passage 50 which connects the second space 24 to the third space 28 is again disposed so as to be centric in the second separation element 26. The passage 50 herein runs through the second separation element internal wall 46, the second separation element 26, and a second separation element external wall 52. The third space 28 is surrounded by the second separation element external wall 52 and a cover internal wall 54 of a cover 14.

Figure 13:
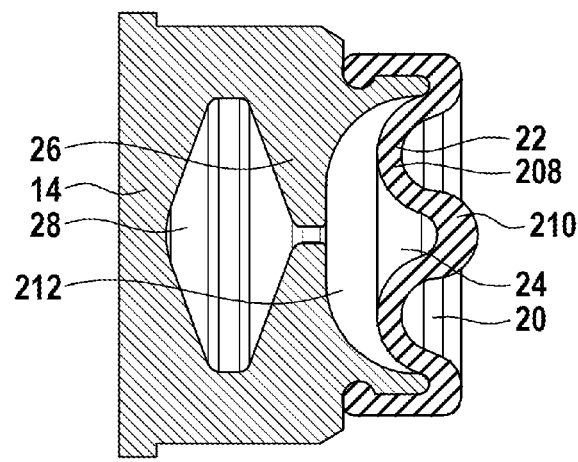
FIG. 13 shows a first part of a damping procedure by means of the brake system damping device according to FIG. 10.

In the initial state of the brake system damping device 10 illustrated in FIG. 13, there is initially no hydraulic pressure applied in the first space 20 in which in turn a brake medium is situated. The separation element 22, which is produced from an elastomer, here is situated substantially in the basic shape thereof. Said separation element 22 herein bears on the housing internal wall 30 in such a manner that the first space 20 is hermetically sealed in relation to the second space 24, wherein a gas, here especially air, is situated in the second space 24. Said gas is also situated in the third space 28 which by means of the passage 50 is connected to the second space 24. Said two spaces 24, 28 thus form a common gas volume that is available for the damping. A better damping effect is again achieved when braking, or when applying a hydraulic pressure to the first space 20, respectively, by virtue of the greater elasticity of said gas volume.

Figure 14:
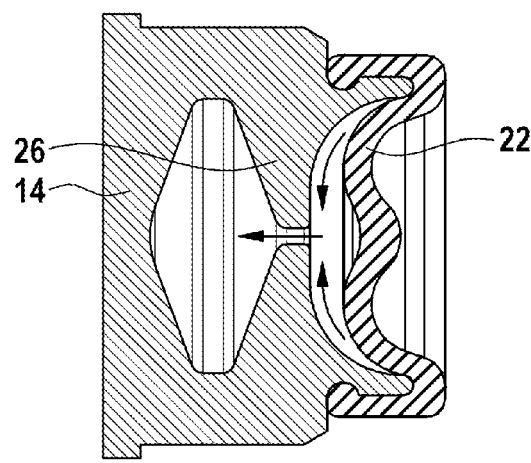
FIG. 14 shows a second part of a damping procedure by means of the brake system damping device according to FIG. 10.

When a hydraulic pressure is applied in the first space 20, the separation element 22 is deformed in such a manner that the gas volume in the second space 24 is reduced in size. The closure element 34 herein moves into the second space 24 in such a manner that the second space 24 by way of the movement of said closure element 34 is steadily reduced in size in the direction of the passage 50. The first membrane curvature 208 herein ends in a convex manner further in the direction toward the separation element internal wall 46 of the second separation element 26, and by way of the separation element external wall 44 thereof bears on said separation element internal wall 46. The second space 24 by way of the movement of the first separation element 22 of this type is concentrically reduced in size toward the passage 50, without any air pockets or gas pockets, respectively, being able to form between the separation element internal wall 46 and the separation element external wall 44 (see FIGS. 13 and 14).

Figure 15:
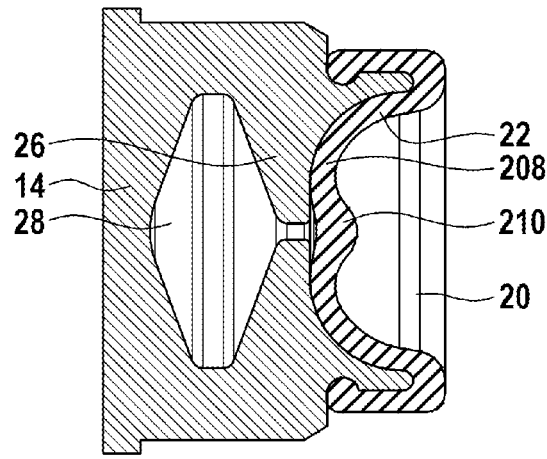
FIG. 15 shows a third part of a damping procedure by means of the brake system damping device according to FIG. 10.
Figure 16:
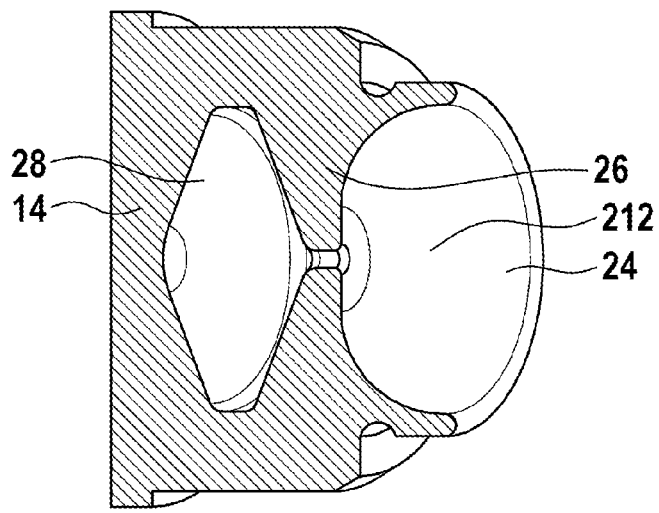
FIG. 16 shows a sectional perspective view of a component of the brake system damping device according to FIG. 10.

The first separation element 22, as from a specific hydraulic pressure which is established above a pressure range that is relevant to the damping, bears in a holohedral manner on the second separation element internal wall 46 of the second separation element 26, and herein also closes the passage 50 toward the third space 28 (see FIG. 15). The second separation element 26 herein acts again like a detent, or like a support, respectively. The second space 24 is now completely emptied, and the third space 28 is also closed. The damping effect now available is almost zero to zero. Said effect is intentional, because the travel of a brake pedal connected to the brake system is thus no longer substantially extended in length.

Figure 17:
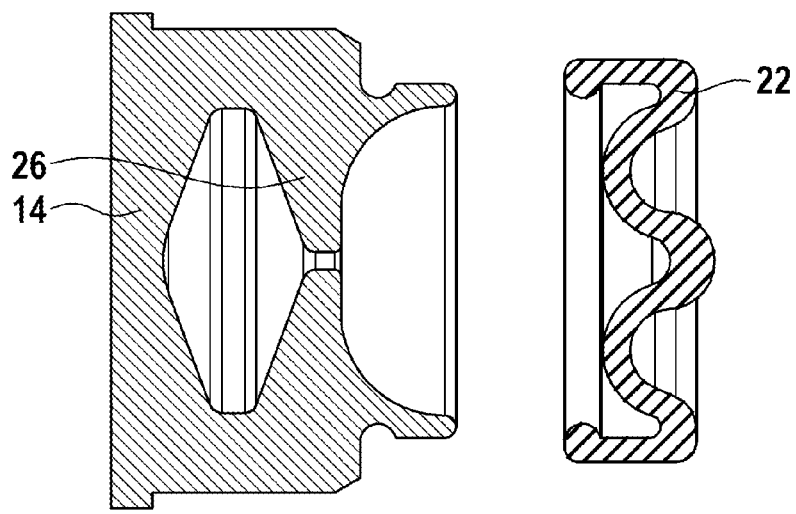
FIG. 17 shows a first step in assembling the brake system damping device according to FIG. 10.
Figure 18:
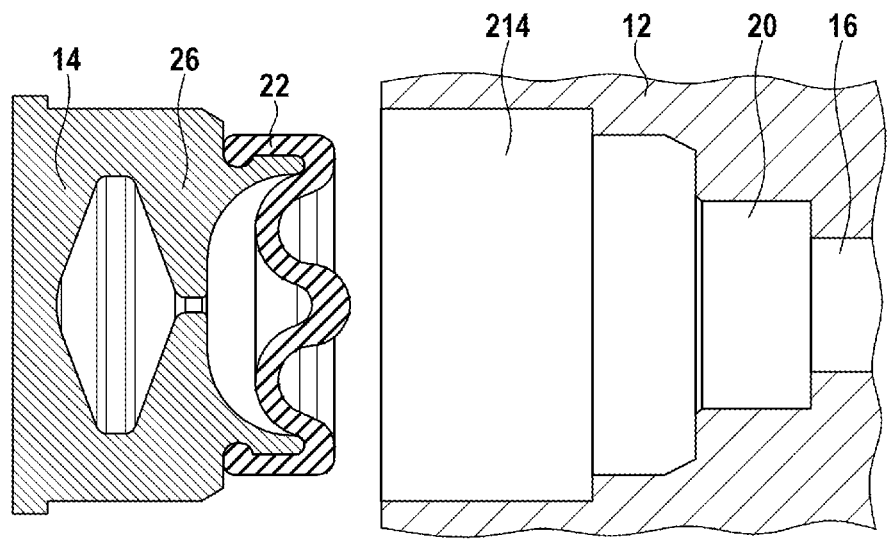
FIG. 18 shows a second step in assembling the brake system damping device according to FIG. 10.
Figure 19:
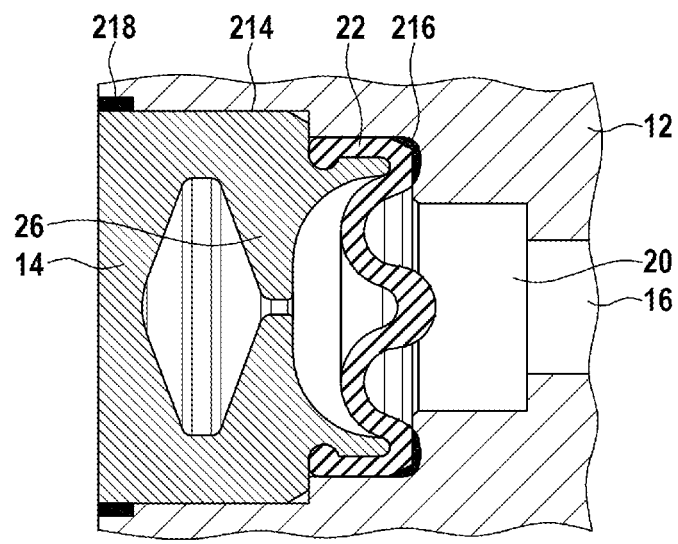
FIG. 19 shows a third step in assembling the brake system damping device according to FIG. 10.

Assembling a brake system damping device of this type is visualized in FIGS. 17 to 19. In the assembly, the first separation element 22 is first placed onto the above-mentioned integral component consisting of the cover 14 and the second separation element 26. Thereafter, the first separation element 22 designed as a roll membrane is pushed over the external periphery of the second separation element 26 and the membrane holding installation 48 thereof. The second space 24 is thus achieved. The functional group thus made from the parts 14, 16, and 22, is then inserted into a stepped bore 214 which is configured in the housing 12. The first space 20 is thus achieved within the bore 214, ahead of the separation element 22. As the components 14, 26 and 22 are inserted, the first separation element 22 on a contact face 216 is simultaneously brought to bear in a fluid-tight manner on the housing 12, and the cover 14 on a contact face 218 on the external circumference thereof is press-fitted into the housing 12 in a locationally fixed manner.

What is claimed is:

1. A brake system damping device, comprising:
a first space to which a hydraulic pressure is to be applied;
a second space in which a compressible medium is situated;
a first separation element configured to separate the first space from the second space;
a cover; and
a second separation element,
wherein the cover and the second separation element define a third space in which the compressible medium is situated,
wherein the second separation element is configured to separate the second space from the third space,
wherein the second separation element defines a passage configured to connect the second space to the third space,
wherein the cover and the second separation element are an integral component, and
wherein the second space and the third space are isolated from the atmosphere.

2. The brake system damping device according to claim 1, wherein the second separation element has a separation element internal wall which, in a longitudinal section of the second space, extends in an arcuate manner toward the passage.

3. The brake system damping device according to claim 1, wherein the first separation element includes a membrane.

4. The brake system damping device according to claim 1, wherein:
the first separation element, at least in portions, is configured as a disk having a circular shape, and wherein
the first separation element has a circular membrane curvature that is disposed so as to be concentric with a center of the circular shape.

5. The brake system damping device according to claim 1, wherein:
the second space is delimited by an internal wall of the second separation element that is disposed so as to be opposite the first separation element, and
the internal wall defines a bowl-shape.

6. The brake system damping device according to claim 1, wherein the cover is configured to hold the first separation element in a housing of the brake system.

7. The brake system damping device according to claim 3, wherein the membrane is a roll membrane.

8. A brake system damping device, comprising:
a first space to which a hydraulic pressure is to be applied;
a second space in which a compressible medium is situated;
a first separation element configured to separate the first space from the second space;
a third space in which a compressible medium is situated; and
a second separation element configured to separate the second space from the third space,
wherein the second space in medium-conducting terms is connected to the third space by a passage configured in the second separation element,
wherein the first separation element is configured so as to be movable and by way of the movement thereof so as to be supported on the second separation element, and
wherein the movement of the first separation element, in at least one direction, is configured to compress the compressible medium in the second space and the third space.

9. The brake system damping device according to claim 8, wherein the first separation element, by way of the movement thereof is configured to bear in a holohedral manner on the second separation element.

10. The brake system damping device according to claim 8, wherein the second space, by way of the movement of the first separation element, is configured to be reduced in size concentrically toward the passage.

11. The brake system damping device according to claim 8, wherein the second space, by way of the movement of the first separation element, is configured to be completely emptied.

12. The brake system damping device according to claim 8, wherein the second separation element has an internal wall which, in a longitudinal section of the second space, extends in an arcuate manner toward the passage.

13. The brake system damping device according to claim 8, wherein the first separation element includes a membrane.

14. The brake system damping device according to claim 13, wherein the membrane is a roll membrane.

15. The brake system damping device according to claim 8, wherein:
the first separation element, at least in portions, is configured as a disk having a circular shape, and wherein
the first separation element has a circular membrane curvature that is disposed so as to be concentric with a center of the circular shape.

16. The brake system damping device according to claim 8, wherein:
the second space is delimited by an internal wall of the second separation element that is disposed so as to be opposite the first separation element, and
the internal wall defines a bowl-shape.

17. The brake system damping device according to claim 8, wherein:
the third space and the second separation element are defined by a component, and the component is configured to hold the first separation element in a housing of the brake system.

* * * * *